United States Patent Office 3,631,042

Patented Dec. 28, 1971

3,631,042

QUINAZOLINE COMPOUNDS

Michel Vincent, Bagneux, Georges Remond, Paris, and Jean-Claude Poignant, Wissous, France, assignors to Societe en nom collectif: "Science Union et Cie, Societe Francaise de Recherche Medicale," Suresnes, France

No Drawing. Filed Oct. 22, 1969, Ser. No. 868,641
Claims priority, application Great Britain, Oct. 31, 1968, 51,720/68
Int. Cl. C07d *51/48*
U.S. Cl. 260—251 8 Claims

ABSTRACT OF THE DISCLOSURE 1H-quinazolin-4-ones substituted in 1-position by alkenyl, haloalkenyl, cycloalkenyl, phenylalkenyl, alkynyl or cyclopropyl, and optionally substituted in 6- or 7-position by halogen, lower alkyl, lower alkyloxy, phenyl, trifluoromethyl or methylenedioxy.

These compounds possess analgesic, antitussive, anti-inflammatory and anti-rheumatic properties.

The present invention provides 1H-quinazolin-4-one compounds of the general Formula I

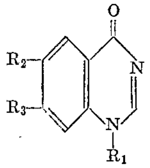

(I)

in which:

$R_1$ represents an alkenyl or haloalkenyl radical containing up to 5 carbon atoms inclusive, a non-aromatic cycloalkenyl radical containing up to 8 carbon atoms inclusive, a phenylalkenyl radical, or an alkynyl radical containing up to 5 carbon atoms inclusive, or a cyclopropyl radical;

$R_2$ and $R_3$ each represents a hydrogen or halogen atom, a lower alkyl or alkyloxy radical containing up to 5 carbon atoms inclusive, a phenyl or trifluoromethyl radical, or $R_2$ and $R_3$ together represent a methylenedioxy radical.

Since certain alkenyl radicals exist in the cis- and trans-forms, the corresponding compounds of the Formula I are likewise included in the present invention.

The compounds of the general Formula I are new compounds and are prepared by condensing a compound of the general Formula II $$R_1—X \qquad (II)$$

wherein X represents a halogen atom and $R_1$ has the meaning given above, with an anthranilamide of the general Formula III

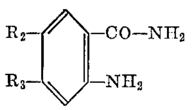

(III)

wherein $R_2$ and $R_3$ have the above meaning, and reacting the so-obtained compound of the general Formula IV

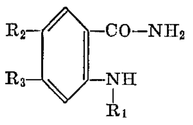

(IV)

wherein $R_1$, $R_2$ and $R_3$ have the meanings given above, with ethyl orthoformate at a temperature ranging from 100 to 200° C., while distilling off the ethanol formed.

The condensation of the compounds (II) and (III) is carried out in an organic solvent such, for example, as dimethylformamide at a temperature ranging from 0 to 120° C., in the presence of an acceptor for the acid HX formed during the reaction; this acid acceptor may be an alkali or alkaline earth metal salt of carbonic acid such, for example, as sodium or potassium carbonate.

All compounds of the general Formula IV are new and are included in the present invention.

The compounds of the general Formulae I and IV are weak bases which can be converted into acid addition salts with acids, and the acid addition salts are included in this invention. These acid addition salts are obtained when a new compound is reacted with an acid in an appropriate protic solvent such, for example, as water or an alcohol, or in an aprotic solvent such, for example, as an ether oxide or a hydocarbon. From among the acids used to form such acid addition salts there may be mentioned, for example, as mineral acids, hydrochloric, hydrobromic, sulphuric and phosphoric acid, and as organic acids, acetic, propionic, maleic, fumaric, methanesulphonic, tartaric, citric, oxalic and benzoic acid.

If desired, these new compounds may be purified by physical methods such, for example, as distillation, crystallization, chromatography, or by chemical operations such, for example, as formation of the above-mentioned salts, crystallization and decomposition of the salts by means of alkaline agents.

The compounds of the general Formula I and their physiologically tolerable acid addition salts possess valuable pharmacological and therapeutic properties, especially analgesic, antitussive, anti-inflammatory and anti-rheumatic properties.

Their toxicity is low and the LD 50 studied in mice varies from 230 to 480 mg./kg. by the intraperitoneal route and from 350 to >1000 mg./kg. by the oral route.

The analgesic activity was investigated by the hot plate method of E. Adami and E. Marazzi (Arch. Int. Pharmacodyn. 107, 322, 1956). It was found that the new compounds when administered to mice at 25 to 100 mg./kg. P.O. increase from 12 to 392% the threshold of pain-perception.

A potent anti-inflammatory activity was also observed for the new compounds, demonstrated by the inhibition of the plantar oedema of the rat's paw, induced by carrageenin (C. H. Winter et al.: Proc. Soc. Exp. Biol. Med. III, 554, 1962). Doses of 30 to 60 mg./kg. S.C. and 40 to 80 mg./kg. P.O. inhibit from 30 to 50% the oedema provoked by intraplantar injection of a solution of 1% of carrageenin.

The antitussive effect of the compounds was studied in the guinea-pig by the method of R. Gooswald (Arz. Fschg. 8, 550, 1958). It was observed that doses of 5 to 30 mg./kg. S.C. and 25 to 50 mg./kg. P.O. inhibit from 17 to 83% the cough induced by inhalation of a 40% citric acid aerosol during 4 minutes.

The hereabove described pharmacological properties and the low toxicity allow the use of the new compounds in therapy, especially in the treatment of pain, inflammation, cough and rheumatic disease.

The present invention also provides pharmaceutical compositions containing a compound of the general Formula I or a physiologically tolerable salt thereof, in admixture or conjunction with a suitable pharmaceutical carrier, such as, for example, distilled water, glucose, lactose, talc, starch, ethylcellulose, stearate of magnesium cocoa-butter, etc. These pharmaceutical compositions may be in form of tablets, dragées, capsules, suppositories or solutions, in order to be administered by the oral, rectal or parenteral route at doses of 50 to 500 mg., 1 to 5 times a day.

The following examples illustrate the invention. Unless otherwise indicated, the melting points were determnied in sealed capillary tubes.

EXAMPLE 1

1-trans-cinnamyl-(1H)-quinazolin-4-one

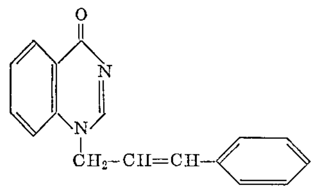

A mixture of 0.1 mol of anthranilamide, 0.1 mol of transcinnamyl bromide and a suspension of 0.1 mol of anhydrous sodium carbonate in 150 ml. of anhydrous dimethylformamide is heated with stirring for 24 hours at 25–30° C. The sodium bromide and sodium bicarbonate formed are then filtered off and the precipitate is washed with a few ml. of dimethylformamide, and the combined filtrates are run at 5 to 10° C. into 1 liter of distilled water. The expected product settles out immediately in the form of a white precipitate; it is suctioned off and washed with water until the filtrate runs neutral. The product is dried under vacuum in a desiccator containing phosphoric acid anhydride and yields 0.09 mole of 2-trans-cinnamyl-amino-benzamide melting at 129–131° C., which is sufficiently pure for the following cyclization.

A sample of the product purified by distillation under vacuum and recrystallization from benzene boils at 220–235° C. under 0.05 mm. Hg pressure and melts at 135–136° C.

A solution of 0.08 mol of 2-trans-cinnamylamino-benzamide (crude) obtained above in 0.4 mol of ethyl orthoformate is kept boiling for 15 hours while distilling off the ethanol formed, and the reaction mixture is then stirred for 15 hours at room temperature.

The precipitate formed is suctioned off, washed with a few ml. of ethyl orthoformate and then with 20 ml. of petroleum ether, dried at room temperature and recrystallized from 220 ml. of ethanol, to yield 0.07 mol of 1-trans-cinnamyl-(1H)-quinazolin-4-one melting at 182–183° C.

EXAMPLES 2 TO 27

The following compounds were prepared according to the method described in Example 1.

(2) 1-allyl-(1H)-quinazolin-4-one melting at 136° C. (Kofler heater), from benzene-cyclohexane; prepared from ethyl orthoformate and 2-allylamino-benzamide, melting at 145–146° C. (ethyl acetate+cyclohexane). The 2-allylamino-benzamide itself is obtained from anthranilamide and allylbromide.

(3) 1-propargyl-(1H)-quinazolin - 4 - one melting at 225° C. (Kofler heater), from aqueous isopropanol; prepared from ethyl orthoformate and 2-propargylamino-benzamide, emlting at 180–183° C. (ethyl acetate). The 2-propargylamino-benzamide itself is prepared from anthranilamide and propargylbromide.

(4) 1-(3-butenyl)-(1H)-quinazolin-4-one melting at 100–101° C. (from benzene); prepared from ethyl orthoformate and 2-(3-butenyl-amino)benzamide, melting at 117–119° C. (ethyl acetate). The 2-(3-butenyl-amino)-benzamide itself is prepared from anthranilamide and 3-butenylbromide.

(5) 1-(2-cyclohexenyl)-(1H)-quinazolin-4-one melting at 127–128° C. (from cyclohexane); prepared from ethyl orthoformate and 2-(3-cyclohexenyl-amino)-benzamide, melting at 73.5–74.5° C. The 2-(2-cyclohexenyl-amino)-benzamide itself is prepared from anthranilamide and 2-cyclohexenylbromide.

(6) 1-(2-cyclopentyl)-(1H)-quinazolin-4-one prepared from ethyl orthoformate and 2-(2-cyclopentyl-amino)-benzamide, itself prepared from anthranilamide and 2-cyclopentenyl-bromide.

(7) 1 - (2 - cyclooctenyl)-(1H)-quinazolin-4 -one prepared from ethyl orthoformate and 2-(2-cyclooctenylamino)-benzamide, itself prepared from anthranilamide and 2-cyclooctenylbromide.

(8) 1 - trans - 2 - butenyl)-(1H)-quianazolin-4-one melting at 83–84° C. (from water, prepared from ethyl orthoformate and 2 - trans - 2-butenylamino-benzamide, melting at 122–123° C. (from ethanol and then benzene). The 2-trans-2-butenylamino-benzamide itself is prepared from anthranilamide and trans-2-butenylbromide.

(9) 1 - (3,3 - dimethyl - allyl)-(1H)-quinazolin-4-one melting at 133–134° C. (from benzene), prepared from ethyl orthoformate and 2-(3,3-dimethyl-allylamino)-benzamide, melting at 122–123° C. (benzene). The 2-(3,3-dimethyl-allylamino)-benzamide itself is prepared from anthranilamide and 3,3-dimethylallylbromide.

(10) 1 - allyl - 7 - chloro - (1H) - quinazolin-4-one melting at 137–139° C. (from benzene), prepared from ethyl orthoformate and 2-allylamino-4-chlorobenzamide, melting at 137–138° C. (from benzene). The 2-allyl-amino-4-chlorobenzamide itself is prepared from 2-amino-4-chlorobenzamide and allylbromide.

(11) 1-allyl-7-bromo-(1H)-quinazoline-4-one prepared from ethyl orthoformate and 2-allylamino-4-bromobenzamide, itself prepared from 2-amino-4-bromobenzamide and allylbromide.

(12) 1-allyl-6-chloro-(1H)-quinazolin-4-one melting at 126–128° C., prepared from ethyl orthoformate and 2-allylamino-5-chlorobenzamide, melting at 114–116° C. (from cyclohexane). The 2-allylamino-5-chlorobenzamide itself is prepared from 2-amino-5-chlorobenzamide and allylbromide.

(13) 1-allyl-6-methoxy-(1H)-quinazolin-4-one melting at 127–129° C. (from benzene), prepared from ethyl orthoformate and 2-allylamino - 5 - methoxy-benzamide, melting at 101–102° C. (from benzene). The 2-allyl-amino-5-methoxy-benzamide itself is prepared from 2-amino-5-methoxy-benzamide and allylbromide.

(14) 1-allyl-6-ethoxy-(1H)-quinazolin-4-one prepared from ethyl orthoformate and 2-allylamino-5-ethoxybenzamide, itself prepared from 2-amino-5-ethoxybenzamide and allylbromide.

(15) 1-allyl-7-methoxy-(1H)-quinazolin-4-one melting at 122–125° C. (from benzene), prepared from ethyl orthoformate and 2-allylamino - 4 - methoxy-benzamide, melting at 155–157° C. (from benzene). The 2-allylamino-4-methoxy-benzamide itself is prepared from 2-amino-4-methoxy-benzamide and allylbromide.

(16) 1-allyl-7-butoxy-(1H)-quinazolin-4-one prepared from ethyl orthoformate and 2-allylamino-4-butoxy-benzamide itself prepared from 2-amino-4-butoxy-benzamide and allylbromide.

(17) 1-allyl-6-methyl-(1H)-quinazolin-4-one melting at 135–137° C. (from benzene), prepared from ethyl orthoformate and 2-allylamino-5-methyl-benzamide, melting at 150–151° C. (from benzene+ethyl acetate). The 2-allyl-amino - 5 - methyl-benzamide itself is prepared from 2-amino-5-methyl-benzamide and allylbromide.

(18) 1-allyl-7-ethyl-(1H)-quinazolin-4-one prepared from ethyl orthoformate and 2-allylamino-4-ethyl-benzamide, itself prepared from 2-amino-4-ethyl-benzamide and allylbromide.

(19) 1-allyl-6-propyl-(1H)-quinazolin-4-one prepared from ethyl orthoformate and 2-allylamino-5-propylbenzamide, itself prepared from 2-amino-5-propyl-benzamide and allylbromide.

(20) 1-allyl - 7-trifluoromethyl-(1H)-quinazolin-4-one melting at 141–142° C. (from water+ethanol), prepared from ethyl orthoformate and 2-allylamino-4-trifluoromethyl-benzamide, melting at 160° C. (from water+ethanol). The 2-allylamino-4-trifluoromethyl-benzamide itself is prepared from 2-amino-4-trifluoromethyl-benzamide and allylbromide.

(21) 1-allyl-6,7-methylenedioxy-(1H)-quinazolin-4-one melting at 198–200° C. (Kofler heater) from water, prepared from ethyl orthoformate and 2-allylamino-4,5-methylenedioxy-benzamide, melting at 191–193° C.

(ethyl acetate). The 2-allylamino-4,5-methylenedioxy-benzamide itself is prepared from 2-amino-4,5-methylene-dioxy-benzamide and allylbromide.

(22) 1-allyl-7-phenyl-(1H)-quinazolin-4-one melting at 177–178° C. (Kofler heater) from ethanol, prepared from ethyl orthoformate and 2-allylamino-4-phenyl-benzamide, melting at 182–183° C. (Kofler heater) from methanol. The 2-allyl-amino-4-phenyl-benzamide itself is prepared from 2-amino-4-phenylbenzamide and allylbromide.

(23) 1-allyl-6-fluoro-(1H)-quinazolin-4-one melting at 104–105° C. (Kofler heater) from benzene+cyclohexane, prepared from ethyl orthoformate and 2-allylamino-5-fluoro-benzamide, melting at 131–133° C. (Kofler heater). The 2-allylamino-5-fluoro-benzamide itself is prepared from 2-amino-5-fluoro-benzamide and allylbromide.

(24) 1-trans-(3-chloro-allyl) - (1H) - quinazolin-4-one melting at 121–122° C. (from ethyl acetate) prepared from ethyl orthoformate and 2-trans-(3-chloro-allyl-amino)-benzamide, melting at 164–166° C. (benzene). The 2-trans-(3-chloro-allylamino)-benzamide itself is prepared from anthranilamide and trans - 1,3 - dichloro-propene.

(25) 1-trans(3-bromoallyl)-(1H)-quinazolin-4-one prepared from ethyl orthoformate and 2-trans-(3-bromo-allylamino)-benzamide, itself prepared from anthranil-amide and trans-1,3-dibromo-propene.

(26) 1-trans-(3-fluoro-allyl) - (1H) - quinazolin-4-one prepared from ethyl orthoformate and 2-trans-(3-fluoro-allylamino)-benzamide, itself prepared from anthranil-amide and trans-1,3-difluoro-propane.

(27) 1-cyclopropyl-(1H)-quinazolin-4-one melting at 126–128° C. (benzene+ethyl acetate), prepared from ethyl orthoformate and 2-cyclopropylamino-benzamide, melting at 155–157° C. (Kofler heater). The 2-cyclo-propylamino-benzamide itself is prepared from anthranil-amide and cyclopropyl chloride.

We claim:

1. A compound selected from the group consisting of (A) —1H-quinazolin-4-one of the formula

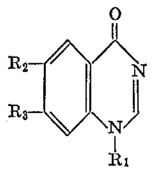

wherein $R_1$ is selected from the group consisting of alkenyl or haloalkenyl containing up to 5 carbon atoms inclusive, cycloalkenyl containing up to 8 carbon atoms inclusive, cinnamyl, alkynyl containing up to 5 carbon atoms inclusive, and cyclopropyl;

$R_2$ and $R_3$ are selected from the group consisting of hydrogen, halogen, lower-alkyl and lower-alkoxy containing up to 5 carbon atoms inclusive, phenyl, trifluoromethyl and methylene-dioxy; and (B) —physiologically acceptable acid addition salts with mineral or organic acids.

2. A compound of claim 1 which is 1-allyl-(1H)-quinazolin-4-one.

3. A compound of claim 1 which is 1-propargyl-(1H)-quinazolin-4-one.

4. A compound of claim 1 which is 1-(2-cyclohexenyl)-(1H)-quinazolin-4-one.

5. A compound of claim 1 which is 1-trans-2-butenyl-(1H)-quinazolin-4-one.

6. A compound of claim 1 which is 1-allyl-7-chloro-(1H)-quinazolin-4-one.

7. A compound of claim 1 which is 1-trans(3-chloro-allyl)-(1H)-quinazolin-4-one.

8. A compound of claim 1 which is 1-cyclopropyl-(1H)-quinazolin-4-one.

References Cited

UNITED STATES PATENTS 3,119,824 1/1964 Scarborough et al. ---- 260—251

ALEX MAZEL, Primary Examiner

R. V. RUSH, Assistant Examiner

U.S. Cl. X.R.

260—240 D, 240 K; 424—251

UNITED STATES PATENT OFFICE

CERTIFICATE OF CORRECTION

Patent No. 3,631,042 Dated 28 December 1971

Inventor(s) QUINAZOLINE COMPOUNDS

It is certified that error appears in the above-identified patent and that said Letters Patent are hereby corrected as shown below:

| | |
|---|---|
| Col. 2, line 71<br>Page 4, line 18 | "determnied"<br>-- determined -- |
| Col. 3, line 43<br>Page 5, line 21 | "from benzene-cyclohexane"<br>-- from benzene+cyclohexane -- |
| Col. 3, line 55<br>Page 5, line 28 | "emlting"<br>-- melting -- |
| Col. 3, line 66 (Example 5)<br>Page 6, line 8 | "2-(3-cyclohexenyl-amino)..."<br>-- 2-(2-cyclohexenyl-amino)... -- |
| Col. 3, line 70 (Example 6)<br>Page 6, line 11 | "1-(2-cyclopentyl)..."<br>-- 1-(2-cyclopentenyl)... -- |
| Col. 3, line 71 (Example 6)<br>Page 6, line 12 | "2-(2-cyclopentyl-amino)..."<br>-- 2-(2-cyclopentenyl-amino)... -- |
| Col. 4, line 4 (Example 8)<br>Page 6, line 20 | "(from water,"<br>-- (from water), -- |
| Col. 4, line 48 (Example 16)<br>Page 7, lines 23-24 | "amide itself"<br>-- ... amide, itself -- |
| Col. 5, line 30 (Example 26)<br>Page 9, line 8 | "propane"<br>-- propene -- |
| Col. 6, lines 9-10, CLAIM 1<br>(following structural formula)<br>Page 10, line 7, CLAIM 1 | "lower-alkoxy"<br>-- lower-alkyloxy -- |

Signed and sealed this 6th day June 1972.

(SEAL)
Attest:

EDWARD M.FLETCHER,JR.
Attesting Officer

ROBERT GOTTSCHALK
Commissioner of Patents